United States Patent
Mofidi et al.

(10) Patent No.: US 9,515,750 B2
(45) Date of Patent: Dec. 6, 2016

(54) SYSTEMS AND METHODS FOR SELF-CALIBRATION FOR WIRELESS COMMUNICATION

(71) Applicant: QUALCOMM Incorporated, San Diego, CA (US)

(72) Inventors: Mahbod Mofidi, San Diego, CA (US); Kritarth Yudhish, San Diego, CA (US); Bakhtiyar Neymanov, San Diego, CA (US); John Saad, Jr., El Cajon, CA (US); Stephen Frankland, Horsham (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/863,131

(22) Filed: Sep. 23, 2015

(65) Prior Publication Data

US 2016/0134382 A1  May 12, 2016

Related U.S. Application Data

(60) Provisional application No. 62/077,070, filed on Nov. 7, 2014.

(51) Int. Cl.
| | |
|---|---|
| *H04B 5/00* | (2006.01) |
| *H04B 17/21* | (2015.01) |
| *G06K 7/10* | (2006.01) |
| *H04B 17/14* | (2015.01) |

(52) U.S. Cl.
CPC .......... *H04B 17/21* (2015.01); *G06K 7/10336* (2013.01); *H04B 5/0075* (2013.01); *H04B 17/14* (2015.01); *H04B 5/0031* (2013.01)

(58) Field of Classification Search
CPC ......... H04B 5/00; H04B 5/009; H04B 5/0093; H04B 17/21; G06K 7/10336
USPC ...................... 455/41.1, 41.2, 41.3
See application file for complete search history.

(56) References Cited

U.S. PATENT DOCUMENTS

| | | | |
|---|---|---|---|
| 6,317,027 B1 * | 11/2001 | Watkins | ............... G06K 7/0008 340/10.1 |
| 8,606,193 B2 | 12/2013 | Ko et al. | |
| 8,786,504 B2 | 7/2014 | Hsu et al. | |

(Continued)

FOREIGN PATENT DOCUMENTS

| | | |
|---|---|---|
| WO | 0042585 A1 | 7/2000 |
| WO | 2009111597 A2 | 9/2009 |

OTHER PUBLICATIONS

International Search Report and Written Opinion—PCT/US2015/052000—ISA/EPO—Dec. 17, 2015.

*Primary Examiner* — Ping Hsieh
(74) *Attorney, Agent, or Firm* — Austin Rapp & Hardman

(57) ABSTRACT

A method for inductively coupled communication is described. The method includes applying a carrier signal at a carrier frequency to an antenna circuit. The antenna circuit includes an antenna and a matching network that resonate at a resonant frequency. The method also includes measuring a looped-back signal over a range of impedance values. The looped-back signal includes the carrier signal received by a receiver coupled to the antenna circuit. The method further includes setting a calibrated impedance as an impedance configuration that produces a resonance peak in the looped-back signal.

26 Claims, 12 Drawing Sheets

(56) References Cited

U.S. PATENT DOCUMENTS

| | | |
|---|---|---|
| 2010/0137024 A1* | 6/2010 | Maguire .............. H04B 1/0458 455/552.1 |
| 2010/0144269 A1 | 6/2010 | Do et al. |
| 2014/0022143 A1 | 1/2014 | Tramoni |
| 2014/0065982 A1 | 3/2014 | Suh et al. |
| 2014/0080409 A1 | 3/2014 | Frankland et al. |
| 2014/0106668 A1 | 4/2014 | Krishnan et al. |
| 2014/0106669 A1 | 4/2014 | Krishnan et al. |
| 2014/0225793 A1* | 8/2014 | Ikemoto ............... H04B 5/0062 343/748 |
| 2014/0256253 A1 | 9/2014 | Cho et al. |
| 2014/0256270 A1 | 9/2014 | Cho et al. |
| 2015/0249510 A1* | 9/2015 | Dhayni ............ G01R 31/31716 455/41.1 |

* cited by examiner

SYSTEMS AND METHODS FOR SELF-CALIBRATION FOR WIRELESS COMMUNICATION

RELATED APPLICATIONS

This application is related to and claims priority from U.S. Provisional Patent Application Ser. No. 62/077,070, filed Nov. 7, 2014, for "Systems and Methods for Near-Field Communication (NFC) Self-Calibration."

TECHNICAL FIELD

The present disclosure relates generally to wireless communications. More specifically, the present disclosure relates to systems and methods for near-field communication (NFC) self-calibration.

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near-field communication (NFC), etc.

When NFC is implemented, NFC-enabled devices may establish a communication link. In order to establish communication properly, various NFC metrics should be within specified values. Benefits may be realized by performing NFC self-calibration to calibrate these NFC metrics.

SUMMARY

A method for inductively coupled communication is described. The method includes applying a carrier signal at a carrier frequency to an antenna circuit. The antenna circuit includes an antenna and a matching network that resonate at a resonant frequency. The method also includes measuring a looped-back signal over a range of impedance values. The looped-back signal includes the carrier signal received by a receiver coupled to the antenna circuit. The method further includes setting a calibrated impedance as an impedance configuration that produces a resonance peak in the looped-back signal.

Measuring the looped-back signal over a range of impedance values may include applying a first impedance configuration to the antenna circuit. A resonance of the looped-back signal based on the first impedance configuration may be measured. Whether there is a subsequent impedance configuration to apply may be determined. The subsequent impedance configuration may be applied to the antenna circuit. Resonance of the looped-back signal based on the subsequent impedance configuration may be measured.

The method may also include determining an impedance offset based on the difference between a default impedance of the matching network and the calibrated impedance. The impedance offset may be applied to the matching network for an operation that uses a second carrier frequency that differs from the carrier frequency used to set the calibrated impedance.

Measuring the looped-back signal over the range of impedance values may include measuring a DC level that is proportional to the looped-back signal. The DC level may be measured over the range of impedance values.

An impedance configuration may include a set of capacitance values applied to one or more capacitors in the matching network that produces a given impedance in the antenna circuit.

The carrier signal may be generated by a near-field communication (NFC) initiator transmitter coupled to the antenna circuit. The carrier signal may be received by an NFC initiator receiver coupled to the antenna circuit.

An electronic device for inductively coupled communication is also described. The electronic device includes a processor, a memory in communication with the processor, and instructions stored in the memory. The instructions are executable by the processor to apply a carrier signal at a carrier frequency to an antenna circuit. The antenna circuit includes an antenna and a matching network that resonate at a resonant frequency. The instructions are also executable to measure a looped-back signal over a range of impedance values. The looped-back signal includes the carrier signal received by a receiver coupled to the antenna circuit. The instructions are further executable to set a calibrated impedance as an impedance configuration that produces a resonance peak in the looped-back signal.

An apparatus for inductively coupled communication is also described. The apparatus includes means for applying a carrier signal at a carrier frequency to an antenna circuit. The antenna circuit includes an antenna and a matching network that resonate at a resonant frequency. The apparatus also includes means for measuring a looped-back signal over a range of impedance values. The looped-back signal includes the carrier signal received by a receiver coupled to the antenna circuit. The apparatus further includes means for setting a calibrated impedance as an impedance configuration that produces a resonance peak in the looped-back signal.

A computer-program product is also described. The computer-program product includes a non-transitory computer-readable medium having instructions thereon. The instructions include code for causing an electronic device to apply a carrier signal at a carrier frequency to an antenna circuit. The antenna circuit includes an antenna and a matching network that resonate at a resonant frequency. The instructions also include code for causing the electronic device to measure a looped-back signal over a range of impedance values. The looped-back signal includes the carrier signal received by a receiver coupled to the antenna circuit. The instructions further include code for causing the electronic device to set a calibrated impedance as an impedance configuration that produces a resonance peak in the looped-back signal.

A method for inductively coupled communication is described. The method includes applying a carrier signal at a carrier frequency in a tuning range. The antenna circuit includes an antenna and a matching network that resonate at a resonant frequency. The method also includes determining a calibrated impedance for the carrier signal at the applied carrier frequency that produces a resonance peak in a looped-back signal. The looped-back signal includes the carrier signal received by a receiver coupled to the antenna circuit. The method further includes associating the calibrated impedance with the carrier frequency.

The method may also include determining that there is a next carrier frequency to be calibrated in the tuning range. A carrier signal may be applied at the next carrier frequency in the tuning range. A calibrated impedance may be determined for the carrier signal at the next carrier frequency that produces a resonance peak in the looped-back signal. The calibrated impedance may be associated with the next carrier frequency.

The method may also include applying a calibrated impedance for a given carrier frequency based on the carrier frequency association.

An electronic device for inductively coupled communication is also described. The electronic device includes a processor, a memory in communication with the processor, and instructions stored in the memory. The instructions are executable by the processor to apply a carrier signal at a carrier frequency in a tuning range. The antenna circuit includes an antenna and a matching network that resonate at a resonant frequency. The instructions are also executable to determine a calibrated impedance for the carrier signal at the applied carrier frequency that produces a resonance peak in a looped-back signal. The looped-back signal includes the carrier signal received by a receiver coupled to the antenna circuit. The instructions are further executable to associate the calibrated impedance with the carrier frequency.

An apparatus for inductively coupled communication is also described. The apparatus includes means for applying a carrier signal at a carrier frequency in a tuning range. The antenna circuit includes an antenna and a matching network that resonate at a resonant frequency. The apparatus also includes means for determining a calibrated impedance for the carrier signal at the applied carrier frequency that produces a resonance peak in a looped-back signal. The looped-back signal includes the carrier signal received by a receiver coupled to the antenna circuit. The apparatus further includes means for associating the calibrated impedance with the carrier frequency.

A computer-program product is also described. The computer-program product includes a non-transitory computer-readable medium having instructions thereon. The instructions include code for causing an electronic device to apply a carrier signal at a carrier frequency in a tuning range. The antenna circuit includes an antenna and a matching network that resonate at a resonant frequency. The instructions also include code for causing the electronic device to determine a calibrated impedance for the carrier signal at the applied carrier frequency that produces a resonance peak in a looped-back signal. The looped-back signal includes the carrier signal received by a receiver coupled to the antenna circuit. The instructions further include code for causing the electronic device to associate the calibrated impedance with the carrier frequency.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
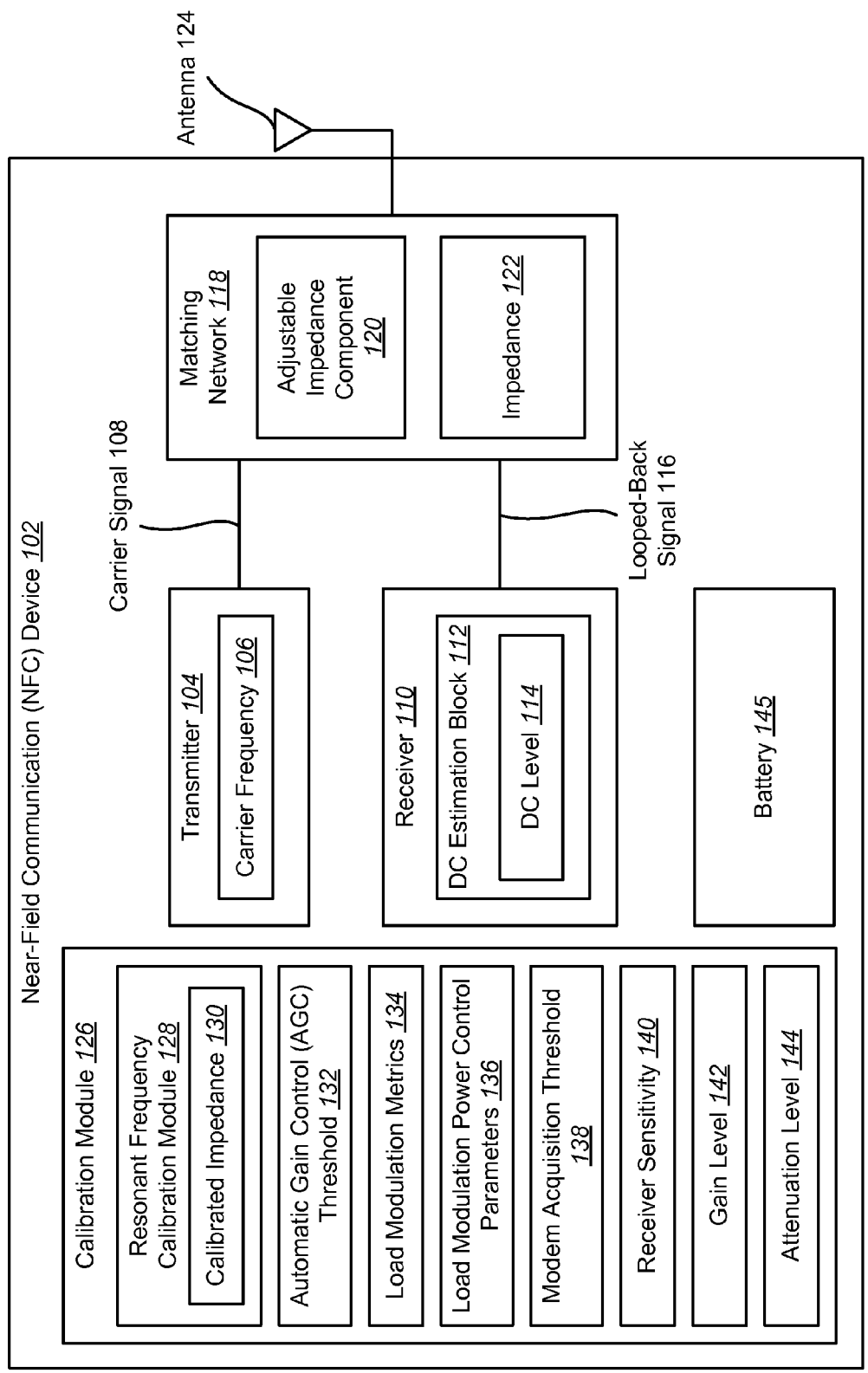
FIG. 1 is a block diagram illustrating one configuration of a near-field communication (NFC) device configured for self-calibration.

FIG. 1 is a block diagram illustrating one configuration of a near-field communication (NFC) device 102 configured for self-calibration. The NFC device 102 may be a wireless communication device that may communicate with a remote device (not shown) using NFC protocols. NFC is an inductively coupled communication technology. Therefore, the NFC device 102 may also be referred to as an inductively coupled communication device.

In the context of NFC, there are two devices communicating: an initiator and a target. The NFC device 102 may be either an initiator or a target depending on the context. The antenna 124 of an initiator NFC device produces a radiated field (also referred to as a magnetic field or an electromagnetic field) that is received by the antenna 124 of the target NFC device. An initiator NFC device may also be referred to as a poller, polling device or initiator. A target NFC device may also be referred to as a listener, listening device or target.

The NFC device 102 may use one or more NFC signaling technologies to communicate with a remote device. The NFC signaling technologies may include NFC type-A, NFC type-B and NFC type-F. The NFC signaling technologies differ in the modulation schemes employed.

NFC has four different tag types, which support a subset of the NFC signaling technologies. Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In one configuration, the NFC device 102 may be operable to communicate using NFC through various interfaces, such as a frame radio frequency (RF) interface, ISO-data exchange protocol (DEP) RF interface and NFC-DEP RF interface. In another configuration, the NFC device 102 may establish an NFC-DEP RF protocol-based communication link with link layer connections defined through a logical link control protocol (LLCP). In still another configuration, the NFC device 102 may be operable to be connected to an access network and/or core network (e.g., a CDMA network, a GPRS network, a UMTS network, and other types of wireline and wireless communication networks).

The NFC device 102 may poll for nearby remote devices configured with NFC. A remote device may begin to listen when it comes within a few centimeters of the NFC device 102. The NFC device 102 will then communicate with the remote device in order to determine which signaling technologies can be used. In one case, the NFC device 102 may be acting as a reader. In one example, a user may place an NFC device 102 in the vicinity of the remote device to initiate a payment transaction.

The NFC device 102 may generate an RF field to communicate with a remote device. The NFC device 102 may modulate the RF field to send a signal (e.g., data) to the NFC device 102. Once the remote device receives that signal, the NFC device 102 may transmit a continuous wave to maintain the RF field. The continuous wave may have a carrier frequency 106. In the case of NFC, the carrier frequency 106 may be 13.56 megahertz (MHz).

In NFC operation, a remote device may receive the RF field. The remote device may respond by performing modulation on top of the continuous wave. The NFC device 102 may receive the modulated signal and may try to decode it.

In order to establish reliable communication links, the NFC device 102 should maintain various metrics within specified tolerances. One important metric is the resonant frequency of the NFC device 102. For certain NFC card emulation solutions, it is important to maintain accurate resonant frequency (Fres) across NFC devices 102 for improved interoperability tests (IOT) with various readers.

However, the actual resonant frequency (Fres) can vary significantly from its targeted/designed frequency. This may be due to matching network 118 components and antenna 124 tolerances across NFC devices 102. The matching network 118 and antenna 124 inductance tolerance during production of NFC devices 102 may result in resonant frequency variations. Also, resonant frequency variations may occur after an NFC device 102 has been sold to the user. For example, the back cover of an NFC device 102 may include the NFC antenna 124. If the back cover breaks, and needs replacement, the new antenna 124 inductance may change significantly. This may result in degradation in intended performance.

Similarly, if an NFC antenna 124 resides on top of a battery 145 that is changed, the new antenna inductance could significantly change the resonant frequency, resulting in degradation in intended performance. In some configurations, the NFC device 102 may support a hot swap of the battery 145, which may result in a new antenna 124 inductance and a changed resonant frequency of the NFC device 102.

It should be noted that while the antenna 124 is depicted in FIG. 1 as being separate from the battery 145, the antenna 124 and the battery 145 may reside on the same physical structure. For example, the antenna 124 may be attached to the battery 145.

Additionally, other mechanical variations in the NFC device 102 that affect the air gap between the battery 145 and the antenna 124 may result in a significant deviation of the intended resonant frequency and the actual resonant frequency. Other metrics may be affected similarly by variations in the NFC device 102.

In one approach, the resonant frequency and other metrics can be calibrated using test equipment and instruments such as network analyzers. However, this approach can be costly and may potentially increase calibration times. Furthermore, after an NFC device 102 is sold to the end user, access to these testers will be highly improbable.

Apart from resonant frequency, there is a need to optimize other metrics for every NFC device 102 for best performance. There needs to be a high confidence level that each NFC device 102 produced at factory can pass NFC Forum, EMVCo, ISO, and other compliance requirements in addition to carrier reader interoperability tests (IOTs) for type approval. This also holds true after replacing a broken back cover and dead batteries 145 in the field.

Higher confidence can be gained by calibrating important initiator and target receive (RX) and transmit (TX) metrics. One of these calibrated metrics may include automatic gain control (AGC) thresholds 132. Other calibrated metrics may include load modulation metrics 134 such as target transmit (TTX) load modulation amplitude. Yet other calibrated metrics may include load modulation power control parameters 136 such as active load modulation (ALM) or passive load modulation (PLM) power control. Target receive (TRX) and initiator receive (IRX) modem metrics such as modem acquisition thresholds 138 may also be calibrated. Various other metrics including receiver sensitivity 140, gain level 142 and attenuation level 144 may also be calibrated.

Even with tighter tolerances during production, the resonant frequency and other metrics may vary significantly. For example, even with tighter tolerances for matching network 118 components (+/−2%) and tighter antenna inductance tolerance (+/−1.5%) the resonant frequency can vary significantly (e.g., +/−350 kHz to +/−400 kHz). Furthermore, variations (e.g., mechanical or electrical) after an NFC device 102 is sold to a user may degrade NFC performance. The above issues underscore the need for self-calibration without any external testers or equipment. Therefore it is beneficial to have self-calibration to reduce the variation of resonant frequency and other metrics to be within specified tolerances.

The NFC device 102 may calibrate one or more metrics for inductively coupled communication. In one approach, the NFC device 102 may calibrate the resonant frequency and other metrics by looping back a signal from the transmitter 104 to the receiver 110. This approach may be referred to as a loopback method.

In a configuration, the NFC device 102 may include a calibration module 126 to perform self-calibration. The calibration module 126 may be implemented in software (e.g., executable instructions stored in memory), hardware (e.g., circuitry) or a combination of software and hardware. In one example, the calibration module 126 may be implemented as code executed by a processor of the NFC device 102.

The antenna circuit of the NFC device 102 may include the antenna 124 and the matching network 118. The antenna 124 and the matching network 118 may form a resonant circuit (also referred to as a tank circuit) that acts as a resonator that oscillates at the circuit's resonant frequency.

The matching network 118 may include an adjustable impedance component 120. The resonance of the antenna circuit may be adjusted by changing the impedance 122 of the matching network 118. In one configuration, the adjustable impedance component 120 may be a capacitor bank in which one or more capacitors may be added or subtracted. In another configuration, the adjustable impedance component 120 may include one or more adjustable (or switchable) capacitors. By changing the capacitor configuration, the impedance 122 (and therefore resonance) of the matching network 118 may be adjusted. As the resonance of the matching network 118 is adjusted, the resonant frequency of the entire solution (e.g., the matching network 118 and antenna 124) is adjusted.

The calibration module 126 may include a resonant frequency calibration module 128 to calibrate one or more resonant frequencies. The resonant frequency calibration module 128 may instruct the transmitter 104 to apply a carrier signal 108 at a carrier frequency 106 to the antenna circuit. The carrier frequency 106 of the carrier signal 108 may be 13.56 megahertz (MHz). In other words, the carrier frequency 106 may be the standard frequency used for NFC.

The resonant frequency calibration module 128 may sweep the matching network 118 over a range of resonant frequencies. In one configuration, the resonant frequency calibration module 128 may adjust the impedance 122 of the matching network 118 over a range of impedance values. For example, the resonant frequency calibration module 128 may adjust the adjustable impedance component 120 to produce different impedances in the matching network 118. As described above, by changing the impedance 122 of the matching network 118, the resonance of the antenna circuit may be adjusted. In one implementation, this may include adjusting one or more capacitors in the matching network 118 to produce a set of different impedances.

The carrier signal 108 may be looped back to the receiver 110 that shares the matching network 118 and antenna 124 with the transmitter 104. The path from the transmitter 104 to the receiver 110 through the matching network 118 may be referred to as a loopback path. Therefore, the looped-back signal 116 may be the carrier signal 108 received by the receiver 110 coupled to the antenna circuit.

A DC estimation block 112 in the receiver 110 may measure the looped-back signal 116 over the range of impedance values. The DC estimation block 112 may generate a DC level 114 proportional to the carrier signal 108 that is looped back to the receiver 110. In other words, the DC estimation block 112 may measure a DC level 114 that is proportional to the looped-back signal 116.

The DC estimation block 112 may estimate DC levels 114 of the receiver 110 during the resonance adjustment. Therefore, the DC level 114 may be measured as the impedance 122 of the matching network 118 is adjusted over the range of impedance values.

The resonant frequency calibration module 128 may determine a calibrated impedance 130 of the matching network 118 that produces a resonance in the antenna circuit at the carrier frequency 106. This may be based on the DC level 114 measurement of the looped-back signal 116.

In one implementation, the resonant frequency calibration module 128 may determine an impedance 122 value in the range of impedance values that produces a peak in the looped-back signal 116. In other words, the impedance 122 that results in the greatest DC level 114 response equates to the impedance 122 that achieved resonance in the antenna circuit at the carrier frequency 106. This impedance 122 value may become the calibrated impedance 130 for the matching network 118. In this way, the antenna circuit may be calibrated to resonate at the carrier frequency 106.

The loopback method can also be used to calibrate and optimize other important metrics. This may increase compliance pass rate margins and reader IOT, and maintain the performance after back cover and battery 145 replacements (including hot swap battery 145 replacement).

The NFC device 102 may calibrate automatic gain control (AGC) thresholds 132 for different gain states. These AGC thresholds 132 may include AGC thresholds 132 for target receiver (TRX) operation and initiator receiver (IRX) operation. Before calibration, the AGC thresholds 132 may be preconfigured "golden" values associated with various gain states. During operation, when receiving a carrier signal 108, the NFC device 102 may determine a DC level 114 for the received carrier signal 108. By comparing the DC level 114 to the AGC thresholds 132, the NFC device 102 may determine the gain state for the receiver 110.

Because the coupling factor (k-factor) for new antenna 124 designs could change significantly, the DC level 114 determining which gain state the AGC would fall into could change as well. Therefore, the NFC device 102 may map new DC levels 114 with the correct gain states to compensate for changes in the antenna 124 or other variations in the NFC device 102 than may affect the coupling factor of the antenna 124.

The calibration module 126 may calibrate an AGC threshold 132 for a particular gain state based on a looped-back signal 116. The calibration module 126 may instruct the transmitter 104 to generate a carrier signal 108 with a carrier level corresponding to a gain state. The transmitter 104 may be operating as an initiator transmitter (ITX). In this case, the carrier signal 108 may have a known carrier strength associated with the gain state.

The carrier signal 108 may be looped back to the receiver 110. For AGC threshold 132 calibration, the receiver 110 may be operating as a target receiver (TRX). A DC estimation block 112 in the receiver 110 may measure the looped-back signal 116 by generating a DC level 114. This DC level 114 may be an estimate of the carrier strength as received by the receiver 110.

The calibration module 126 may adjust the AGC threshold 132 for the gain state according the measured looped-back signal 116. The calibration module 126 may adjust the AGC threshold 132 for the gain state from the previously characterized golden AGC thresholds.

The calibration module 126 may calibrate a different AGC threshold 132 for each gain state. In this way, the calibration module 126 may map new DC levels 114 with the correct gain states. Furthermore, the AGC thresholds 132 for a new antenna 124 design can be calibrated on a per-NFC device 102 basis.

The calibration module 126 may also calibrate one or more load modulation metrics 134. These load modulation metrics 134 may include at least one of a target transmit (TTX) passive load modulation amplitude, waveform time and fidelity. The waveform timing may include the rise time, fall time, overshoot and undershoot. The fidelity may include the distortion of a signal.

To calibrate the load modulation metrics 134, the calibration module 126 may implement a procedure similar to the AGC threshold 132 calibration. However, for the load modulation metrics 134 calibration, the transmitter 104 may generate a carrier signal 108 and then load modulate that carrier signal 108. Therefore, the transmitter 104 may operate as both an initiator transmitter (ITX) and a target transmitter (TTX) and the receiver 110 may operate as a target receiver (TRX).

In one approach to load modulation metrics 134 calibration, the calibration module 126 may instruct the transmitter 104 to generate a carrier signal 108 with a carrier frequency 106. The carrier signal 108 may be looped back to the receiver 110. A DC estimation block 112 in the receiver 110 may measure the looped-back signal 116 by generating a DC level 114.

The calibration module 126 may instruct the transmitter 104 to load modulate the carrier signal 108 as would be done in passive or active load modulation. Using the DC level 114 of the measured looped-back signal 116, the calibration module 126 may adjust one or more of the load modulation metrics 134. For example, the calibration module 126 may compare the amplitude, rise time, fall time, overshoot, undershoot and distortion of the load modulated carrier signal 108 to desired levels. The calibration module 126 may then increase or decrease one or more of these load modulation metrics 134 to be within the desired levels.

The calibration module 126 may also calibrate one or more load modulation power control parameters 136 based on the looped-back signal 116. As with the calibration of the load modulation metrics 134, the calibration module 126 may calibrate each power state for passive load modulation (PLM) and active load modulation (ALM) using the loopback method.

The calibration module 126 may also calibrate one or more modem metrics. These modem metrics may include a modem acquisition threshold 138. In one configuration, the modem acquisition threshold 138 may be used during initiator receiver (IRX) operation.

In one approach to calibrating a modem acquisition threshold 138, the calibration module 126 may instruct the transmitter 104 to generate a polling signal with known characteristics. The polling signal may be a known and previously characterized ITX polling signal. The polling signal may be looped back to the receiver 110, which may be operating as an initiator receiver (IRX). The DC estimation block 112 may measure the looped-back signal 116 by determining a DC level 114 of the looped-back signal 116. The calibration module 126 may adjust the modem acquisition threshold 138 according to the DC level 114 of the looped-back signal 116. For example, the calibration module 126 may map the DC level 114 to the modem acquisition threshold 138 associated with the known characteristics of the polling signal. The modem acquisition thresholds 138 for various polling signal levels may be calibrated and optimized using this loopback method.

Additional parameters may be calibrated using the loopback method described herein. For example, the calibration module 126 may calibrate receiver sensitivity 140 (e.g., TRX and IRX sensitivity), gain level 142 and attenuation level 144 using the loopback method.

The NFC self-calibration can run automatically at boot up of the NFC device 102, or at certain time intervals, or after temperature and voltage fluctuations. Additionally NFC self-calibration may be performed by user commands, such as remotely by a mobile carrier, or by an application installed on the NFC device 102. For example if the NFC device 102 battery 145 dies and the user needs to replace it, there may be an application on the NFC device 102 to enable the NFC self-calibration to calibrate the new antenna 124. In another implementation, the user may contact the carrier due to NFC performance degradation after back cover or battery 145 replacement. Then the mobile carrier may remotely enable the NFC self-calibration. In yet another implementation, the NFC self-calibration may be performed at factory during manufacture of the NFC device 102.

The benefits of the described systems and methods include more robust communication between NFC devices 102. This may result in improved user experience and reduced power consumption by avoiding failed links.

Figure 2:
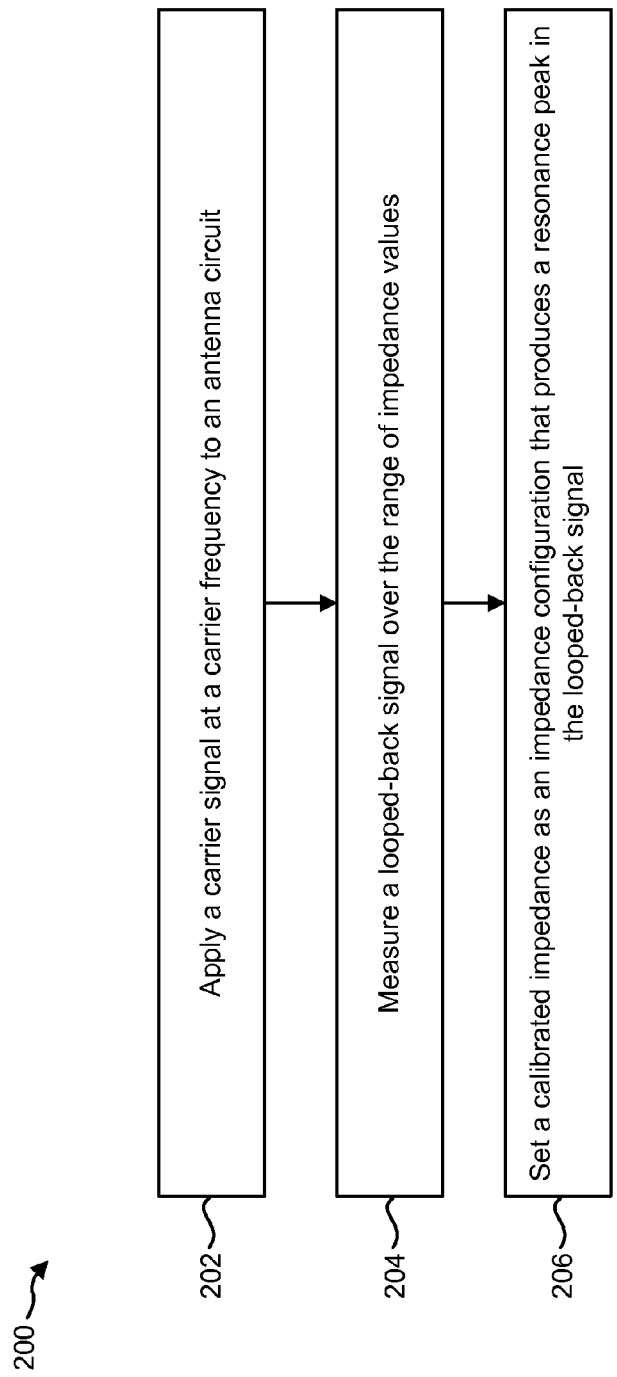
FIG. 2 is a flow diagram illustrating a method for calibrating a resonant frequency.

FIG. 2 is a flow diagram illustrating a method 200 for calibrating a resonant frequency. The method 200 may be performed by an NFC device 102. The NFC device 102 may apply 202 a carrier signal 108 at a carrier frequency 106 to an antenna circuit. For example, a transmitter 104 operating as an initiator transmitter (ITX) may be coupled to the antenna circuit. The transmitter 104 may generate the carrier signal 108. The carrier frequency 106 of the carrier signal 108 may be 13.56 megahertz (MHz). The antenna circuit may include an antenna 124 and a matching network 118 that resonate at a resonant frequency.

The NFC device 102 may adjust 204 the impedance 122 of the matching network 118 over a range of impedance values. For example, the NFC device 102 may adjust one or more capacitors in the matching network 118 to produce a set of different impedances.

The NFC device 102 may measure 206 a looped-back signal 116 over the range of impedance values. The looped-back signal 116 may be the carrier signal 108 received by a receiver 110 coupled to the antenna circuit. The receiver 110 may operate as an initiator receiver (IRX). The carrier signal 108 may be looped back to the receiver 110 that shares the matching network 118 and antenna 124 with the transmitter 104.

The NFC device 102 may measure a DC level 114 proportional to the looped-back signal 116. The NFC device 102 may estimate DC levels 114 of the receiver 110 during the resonance adjustment.

The NFC device 102 may determine 208 a calibrated impedance 130 of the matching network 118 that produces a resonance in the antenna circuit at the carrier frequency 106. This may be based on the DC level 114 measurement of the looped-back signal 116.

In one implementation, the NFC device 102 may determine an impedance 122 value in the range of applied impedance values that produces a peak in the looped-back signal 116. In other words, the impedance 122 that results in the greatest DC level 114 response equates to the impedance 122 that achieved resonance in the antenna circuit at the carrier frequency 106. This impedance 122 value may be set as the calibrated impedance 130 for the matching network 118.

Figure 3:
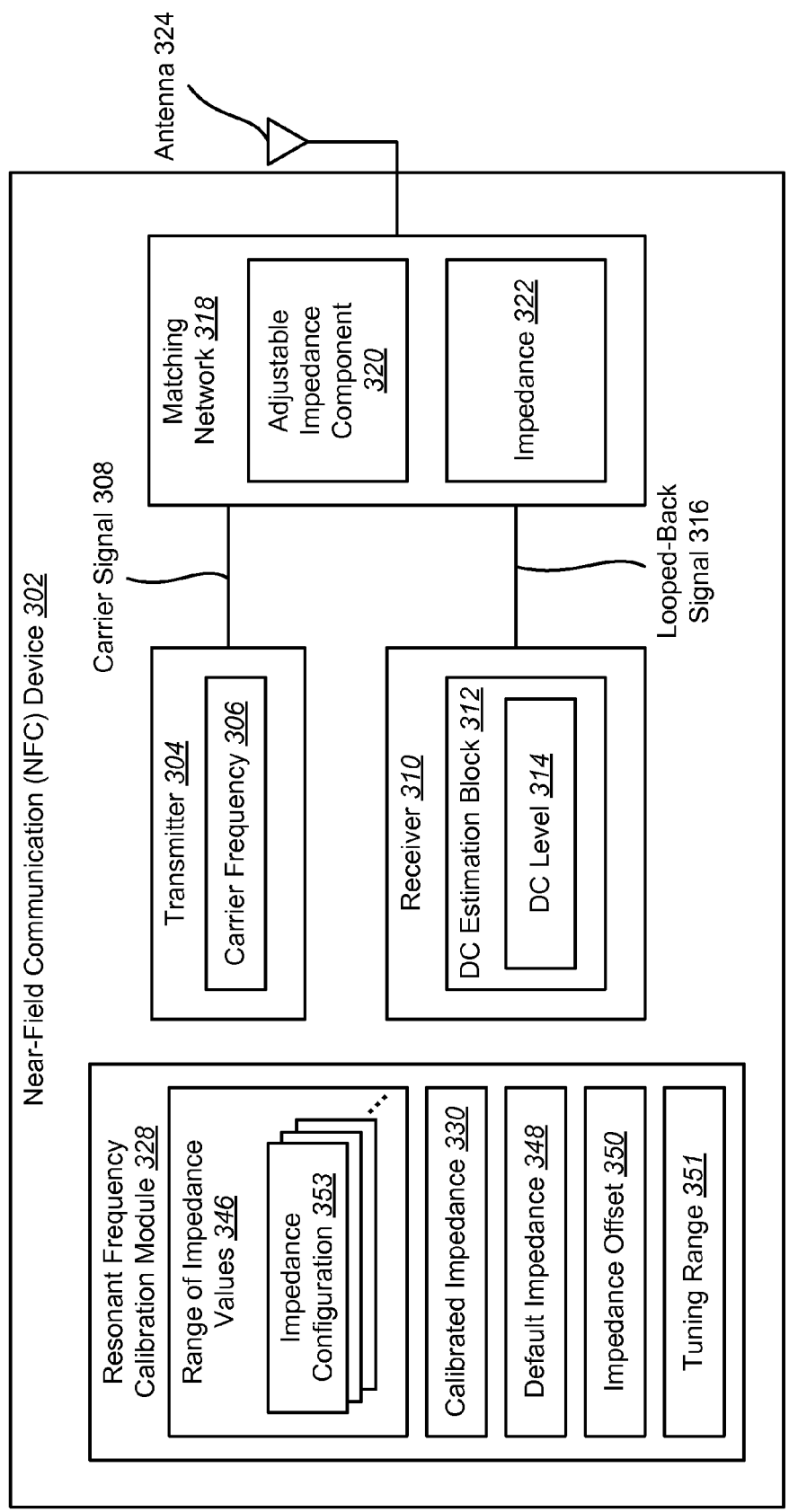
FIG. 3 is a block diagram illustrating one configuration of an NFC device configured for self-calibration of resonant frequency.

FIG. 3 is a block diagram illustrating one configuration of an NFC device 302 configured for self-calibration of resonant frequency. The NFC device 302 may be a wireless communication device that communicates using NFC protocols.

The NFC device 302 may include a transmitter 304 and a receiver 310 coupled to an antenna circuit. The antenna circuit of the NFC device 302 may include the antenna 324 and the matching network 318. The matching network 318 may include an adjustable impedance component 320.

The resonance of the antenna circuit may be adjusted by changing the impedance 322 of the matching network 318. In one configuration, the adjustable impedance component 320 may be a capacitor bank in which one or more capacitors may be added or subtracted. In another configuration, the adjustable impedance component 320 may include one or more adjustable (or switchable) capacitors.

In a configuration, the NFC device 302 may include a resonant frequency calibration module 328 to calibrate one or more resonant frequencies. The resonant frequency calibration module 328 may instruct the transmitter 304 to apply a carrier signal 308 at a carrier frequency 306 to the antenna circuit. The carrier frequency 306 of the carrier signal 308 may be 13.56 megahertz (MHz).

The resonant frequency calibration module 328 may adjust the impedance 322 of the matching network 318 over a range of impedance values 346. The range of impedance values 346 may include various impedance configurations 353 that produce different impedances 322 in the matching network 318. The resonant frequency calibration module 328 may instruct the adjustable impedance component 320 to apply different impedance configurations 353 to produce different impedances 322 in the matching network 318. For example, the adjustable impedance component 320 may adjust one or more capacitors based on an impedance configuration 353.

The impedance configurations 353 may be a set of capacitance values applied to one or more capacitors in the matching network 318 that produces a given impedance 322 in the antenna circuit. In an approach, the impedance configurations 353 may be implemented as cap codes. A cap code may instruct the matching network 318 to apply a particular configuration of capacitors. In one implementation, a cap code is a pair of bits in a register byte that maps to a value of capacitance in an on-chip capacitor bank.

Each cap code may produce a different impedance of the matching network 318. For example, there may be 32 values (e.g., 00h to 1Fh) of internal capacitance available for tuning an external tank circuit (e.g., the matching network 318 and antenna 324). Because the receiver 310 uses the same matching network 318 and antenna 324 as the transmitter 304, the frequency response of the entire solution versus cap codes can be obtained.

The carrier signal 308 may be looped back to the receiver 310 that shares the matching network 318 and antenna 324 with the transmitter 304. A DC estimation block 312 in the receiver 310 may measure the looped-back signal 316 over the range of impedance values 346.

The DC estimation block 312 may estimate DC levels 314 of the receiver 310 during the resonance adjustment. The DC level 314 may be measured as the impedance 322 of the matching network 318 is adjusted over the range of impedance values 346.

The resonant frequency calibration module 328 may determine a calibrated impedance 330 of the matching network 318 that produces a resonance in the antenna circuit at the carrier frequency 306. The resonant frequency calibration module 328 may determine an impedance configuration 353 in the range of impedance values 346 that produces a peak in the looped-back signal 316. For example, the resonant frequency calibration module 328 may determine which cap code results in the greatest DC level 314 response. This cap code may be the calibrated impedance 330 (also referred to as calibrated cap code) for the matching network 318. In this way, the antenna circuit may be calibrated to resonate at the carrier frequency 306.

The NFC device 302 may also use the calibrated impedance 330 to calibrate other resonant frequencies for modes that use a different carrier frequency 306. In one configuration, the resonant frequency calibration module 328 may determine an impedance offset 350 as the difference between a default impedance 348 of the matching network 318 and the calibrated impedance 330. The default impedance 348 may be a preconfigured matching network 318 impedance 322 that is associated with the carrier frequency 306. For example, the default impedance 348 may be produced by a default impedance configuration 353. Upon determining the calibrated impedance 330, the resonant frequency calibration module 328 may subtract the calibrated impedance 330 from an initial default impedance 348 to obtain the impedance offset 350.

The resonant frequency calibration module 328 may apply the impedance offset 350 to the matching network 318 for transmit or receive operations that use a different carrier frequency 306. Therefore, for other transmit and receive modes that use a different resonance, the resonant frequency calibration module 328 may adjust the impedance 322 for those modes by the impedance offset 350.

In the cap code approach, the resonant frequency calibration module 328 may determine a cap code offset as the difference between a default cap code for the carrier frequency 306 and the calibrated cap code. The offset from a default cap code to the calibrated cap code is the cap code offset. In this approach, the cap code offset can now be applied to all other cap codes for other modes that use a different resonance.

In another implementation, the NFC device 302 may calibrate resonant frequencies over a tuning range 351. As the impedance 322 values (e.g., cap code values) near the low and high end of the range of impedance values 346, the resonant frequency error could increase. To reduce the resonant frequency error across a full tuning range 351, the carrier signal 308 can be swept to cover the entire tuning range 351. For example, various carrier frequencies 306 from 12 MHz to 16 MHz (or an even wider range) may be supported by the range of the matching network 318. Multiple calibrated impedances 330 may be mapped to multiple carrier frequencies 306 within the tuning range 351. Calibrating multiple resonant frequencies over a tuning range 351 is described in more detail in connection with FIG. 5.

Figure 4:
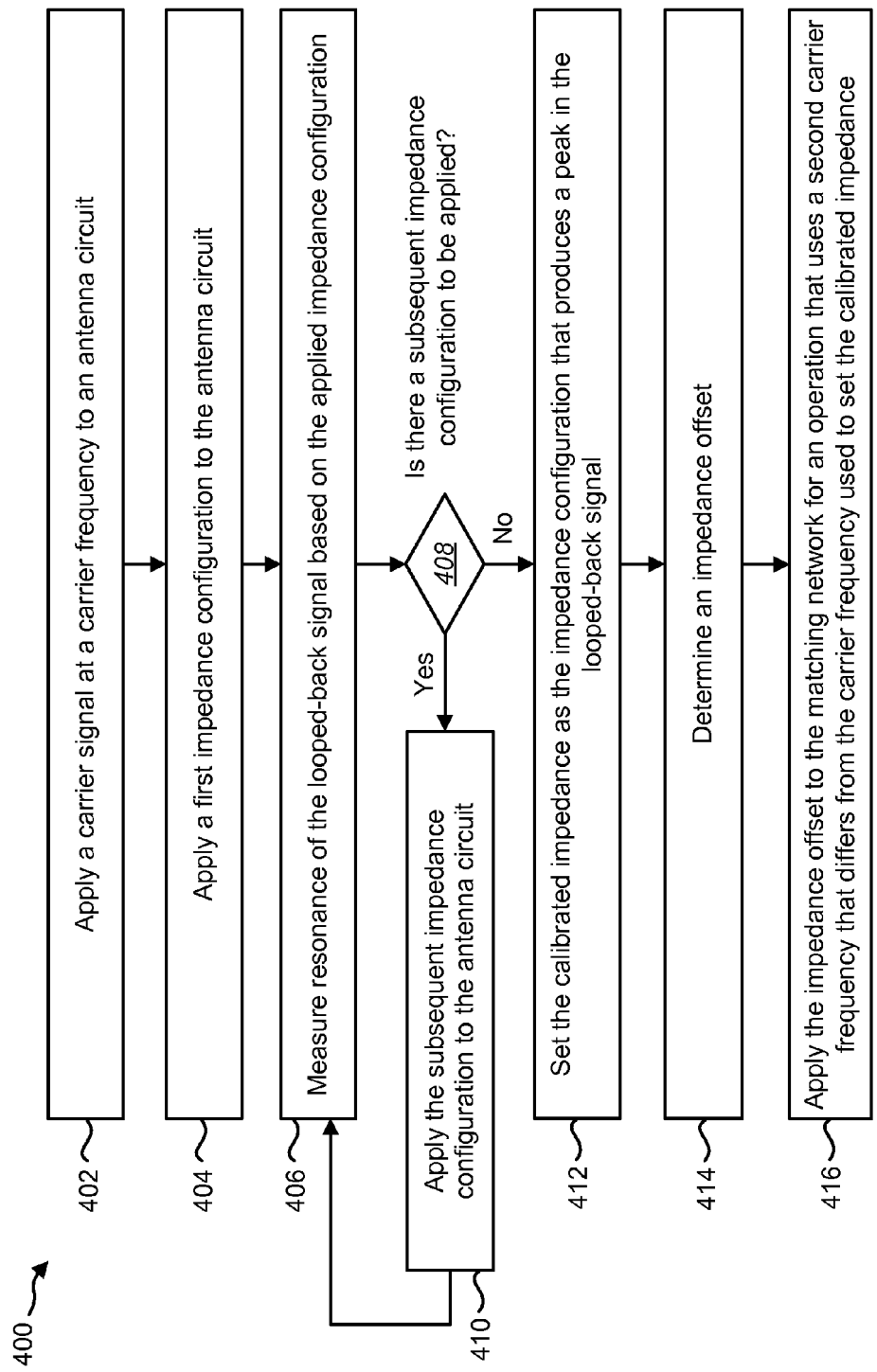
FIG. 4 is a flow diagram illustrating a detailed configuration of a method for calibrating a resonant frequency.

FIG. 4 is a flow diagram illustrating a detailed configuration of a method 400 for calibrating a resonant frequency. The method 400 may be performed by an NFC device 302. The NFC device 302 may apply 402 a carrier signal 308 at a carrier frequency 306 to an antenna circuit. For example, a transmitter 304 operating as an initiator transmitter (ITX) may generate the carrier signal 308. The carrier frequency 306 of the carrier signal 308 may be 13.56 megahertz (MHz).

The NFC device 302 may apply 404 a first impedance configuration 353. The NFC device 302 may adjust the impedance 322 of the matching network 318 over a range of impedance values 346. The range of impedance values 346 may include various impedance configurations 353 that produce different impedances 322 in the matching network 318. An adjustable impedance component 320 may apply the first impedance configuration 353 to produce a first impedance 322 in the matching network 318.

The NFC device 302 may measure 406 a looped-back signal 316. The carrier signal 308 may be looped back to the receiver 310 that shares the matching network 318 and antenna 324 with the transmitter 304. A DC estimation block 312 in the receiver 310 may measure the looped-back signal 316 over the range of impedance values 346. A DC level 314 of the looped-back signal 316 may be stored.

The NFC device 302 may determine 408 whether there is a subsequent impedance configuration 353 in the range of impedance values 346. If there are additional impedance configurations 353, then the NFC device 302 may apply 410 the next impedance configuration 353. The adjustable impedance component 320 may apply the next impedance configuration 353 to produce another impedance 322 in the matching network 318. The NFC device 302 may measure 406 the looped-back signal 316 corresponding to the current impedance configuration 353. The NFC device 302 may continue applying and measuring different impedance configurations 353 in the range of impedance values 346 until the NFC device 302 determines 408 that there are no more impedance configurations 353 in the range of impedance values 346.

The NFC device 302 may set 412 the calibrated impedance 330 as the impedance configuration 353 that produces a peak in the looped-back signal 316. The impedance configuration 353 that results in the greatest DC level 314 response equates to the impedance 322 that achieved resonance in the antenna circuit at the carrier frequency 306. This impedance configuration 353 may be set 412 as the calibrated impedance 330 for the matching network 318. In this way, the antenna circuit may be calibrated to resonate at the carrier frequency 306.

The NFC device 102 may determine 414 an impedance offset 350. The impedance offset 350 may be the difference between a default impedance 348 of the matching network 318 and the calibrated impedance 330. The default impedance 348 may be a preconfigured matching network 318 impedance 322 that is associated with the carrier frequency 106. Upon determining the calibrated impedance 330, the NFC device 302 may subtract the calibrated impedance 330 from an initial default impedance 348 to obtain the impedance offset 350.

The NFC device 302 may apply 416 the impedance offset 350 to the matching network 318 for an operation (e.g., transmit or receive operation) that uses a second carrier frequency 306 that differs from the carrier frequency 306 used to set the calibrated impedance different carrier frequency 306. For example, the NFC device 302 may adjust the impedance 322 by the impedance offset 350 for transmit and receive modes that use a different resonance. Therefore, for modes that use a carrier frequency 306 other than 13.56 MHz, the NFC device 302 may adjust the impedance 322 for those modes by the impedance offset 350. In one implementation, the NFC device 302 may apply the impedance offset 350 to multiple carrier frequencies 306 in a tuning range 351.

Figure 5:
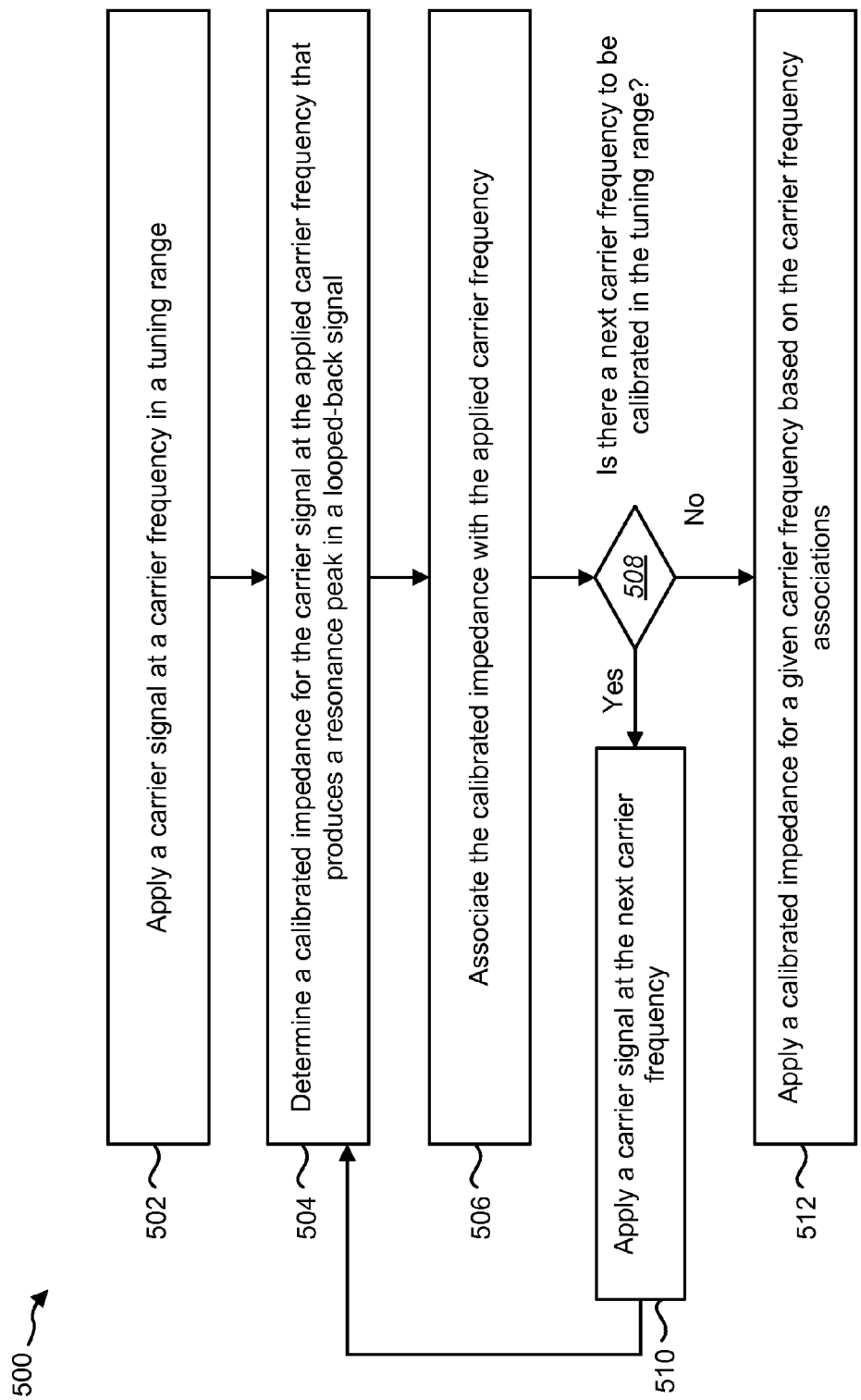
FIG. 5 is a flow diagram illustrating a method for calibrating multiple resonant frequencies over a tuning range.

FIG. 5 is a flow diagram illustrating a method 500 for calibrating multiple resonant frequencies over a tuning range 351. The method 500 may be performed by an NFC device 302. As described in FIG. 4, in one approach, the NFC device 302 may apply an impedance offset 350 to multiple carrier frequencies 306 in a tuning range 351. For example, various carrier frequencies 306 from 12 MHz to 16 MHz (or an even wider range) may be supported by the range of the matching network 318.

The impedance offset 350 may be based on a carrier frequency 306 centered in the tuning range 351. However, by applying a single impedance offset 350, resonant frequency error could increase for carrier frequencies 306 near the low and high end of the tuning range 351.

To reduce the resonant frequency error across the full tuning range 351, the carrier signal 308 can be swept to cover an entire tuning range 351. The NFC device 302 may apply 502 a carrier signal 308 at a first carrier frequency 306 in the tuning range 351. For example, a transmitter 304 operating as an initiator transmitter (ITX) may generate the carrier signal 308 at 12 MHz.

The NFC device 302 may determine 504 a calibrated impedance 330 for the first carrier frequency 306 using the loopback method. This may be accomplished as described above in connection with FIG. 4. In this way, the NFC device 302 may calibrate the resonant frequency for the first carrier frequency 306. The NFC device 302 may map 506 the calibrated impedance 330 to the first carrier frequency 306.

The NFC device 302 may determine 508 whether there is a next carrier frequency 306 to be calibrated in the tuning range 351. In an implementation, the tuning range 351 may include multiple carrier frequencies 306. The carrier frequencies 306 may be distributed in equal increments within the tuning range 351.

If there are additional carrier frequencies 306 to be calibrated, the NFC device 302 may apply 510 a carrier signal 308 at the next carrier frequency 306 in the tuning range 351. The NFC device 302 may then determine 504 the calibrated impedance 330 for the applied carrier frequency 306 and map 506 the calibrated impedance 330 to the applied carrier frequency 306. This procedure may be repeated for all carrier frequencies 306 in the tuning range 351.

Upon determining 508 that there are no more carrier frequencies 306 to calibrate, the NFC device 302 may apply 512 the mapped calibrated impedances 330 during operation. Therefore, the NFC device 302 may apply 512 a calibrated impedance 330 for a transmit or receive mode that uses one carrier frequency 306 and may switch to another calibrated impedance 330 for a transmit or receive mode that uses another carrier frequency 306.

Figure 6:
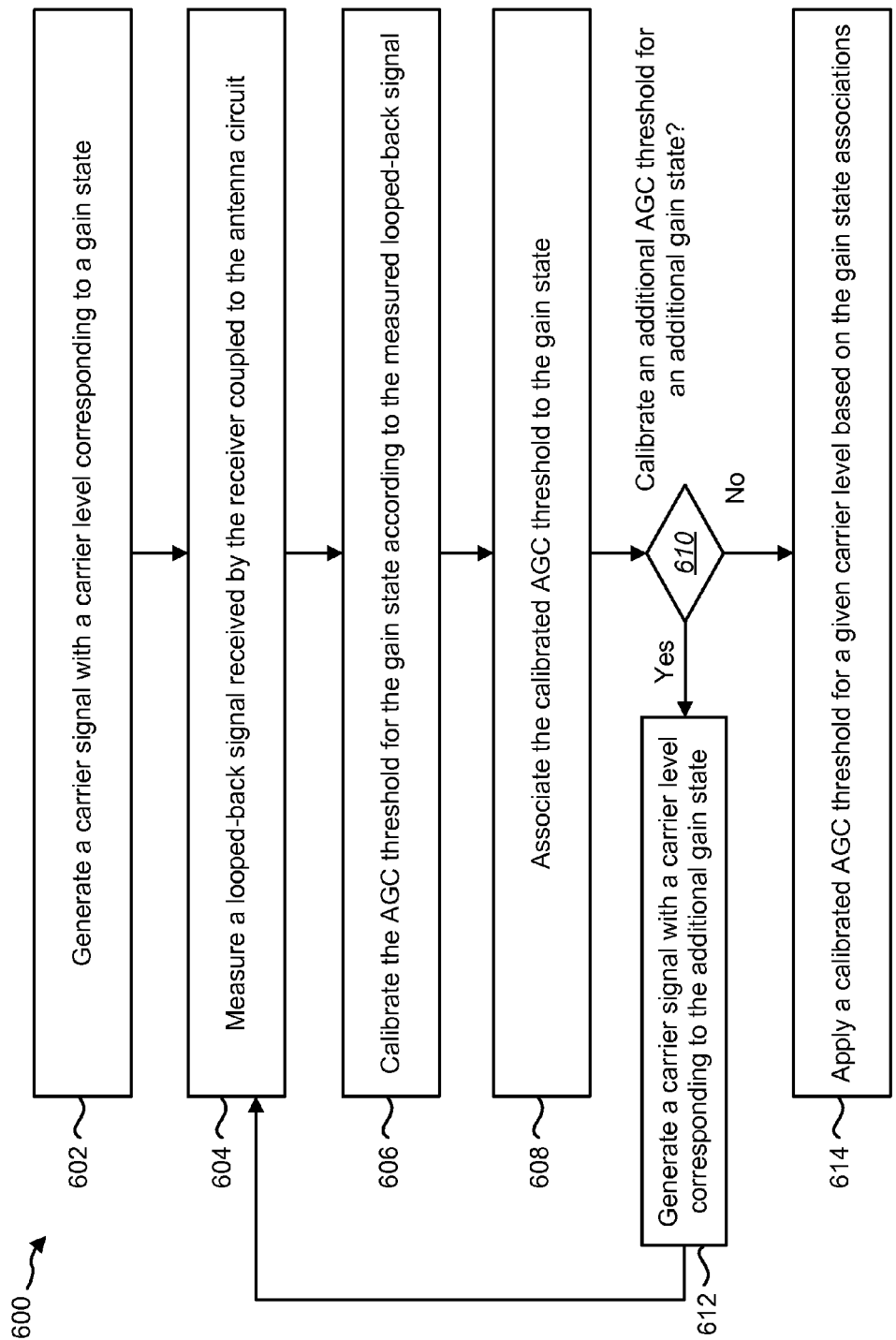
FIG. 6 is a flow diagram illustrating a method for calibrating one or more automatic gain control (AGC) thresholds.

FIG. 6 is a flow diagram illustrating a method 600 for calibrating one or more automatic gain control (AGC) thresholds 132. The AGC thresholds 132 may be associated with one or more gain states for a receiver 110. These AGC thresholds 132 may include AGC thresholds 132 for target receiver (TRX) operation and initiator receiver (IRX) operation.

An NFC device 102 may generate 602 generate a carrier signal 108 with a carrier level corresponding to a first gain state. A transmitter 104 may operate as an initiator transmitter (ITX). The transmitter 104 may be coupled to an antenna circuit that includes an antenna 124 and a matching network 118. In this case, the carrier signal 108 may have a known carrier strength associated with the first gain state.

The NFC device 102 may measure 604 a looped-back signal 116 received by the receiver 110 coupled to the antenna circuit. A DC estimation block 112 in the receiver 110 may measure the looped-back signal 116 by generating a DC level 114. This DC level 114 may be an estimate of the carrier strength as received by the receiver 110.

The NFC device 102 may adjust 606 the AGC threshold 132 for the first gain state according the measured looped-back signal 116. The NFC device 102 may adjust 606 the AGC threshold 132 for the gain state from a previously characterized golden AGC threshold associate with the first gain state.

The NFC device 102 may map 608 the calibrated AGC threshold 132 to the first gain state. For example, the NFC device 102 may map 608 the measured DC level 114 with the first gain state.

The NFC device 102 may determine 610 whether to calibrate another AGC threshold 132 for another gain state. If there are additional gain states to calibrate, the NFC device 102 may generate 612 a carrier signal 108 with a carrier level corresponding to the next gain state. The NFC device 302 may then measure 604 the looped-back signal 116 received by the receiver 110. The NFC device 302 may measure 604 the looped-back signal 116 received by the receiver 110. The NFC device 102 may adjust 606 the AGC threshold 132 for the current gain state according the measured looped-back signal 116 and map 608 the calibrated AGC threshold 132 to the current gain state. This procedure may be repeated for all gain states.

Upon determining 610 that there are no more gain states to calibrate, the NFC device 302 may apply 614 the mapped AGC thresholds 132 during operation. Therefore, the NFC device 302 may determine a gain state to apply to the receiver 110 during operation based on the calibrated AGC thresholds 132.

In summary, the method 600 may include generating a carrier signal with a carrier level corresponding to a gain state. The method 600 may also include measuring a looped-back signal, the looped-back signal comprising the carrier signal received by a receiver coupled to an antenna circuit. The method 600 may further include calibrating an automatic gain control (AGC) threshold for the gain state according to the measured looped-back signal. The method 600 may additionally include associating the calibrated AGC threshold to the gain state.

The method 600 may include determining that there is an additional AGC threshold for an additional gain state to be calibrated. The method 600 may also include generating a carrier signal with a carrier level corresponding to the additional gain state. The method 600 may further include measuring the looped-back signal. The method 600 may additionally include calibrating the additional AGC threshold for the additional gain state according to the measured looped-back signal. The method 600 may also include associating the calibrated AGC threshold to the additional gain state.

The method 600 may also include applying a calibrated AGC threshold for a given carrier level based on the gain state association. The carrier signal may be generated by a near-field communication (NFC) initiator transmitter coupled to the antenna circuit and the carrier signal is received by an NFC target receiver coupled to the antenna circuit.

Figure 7:
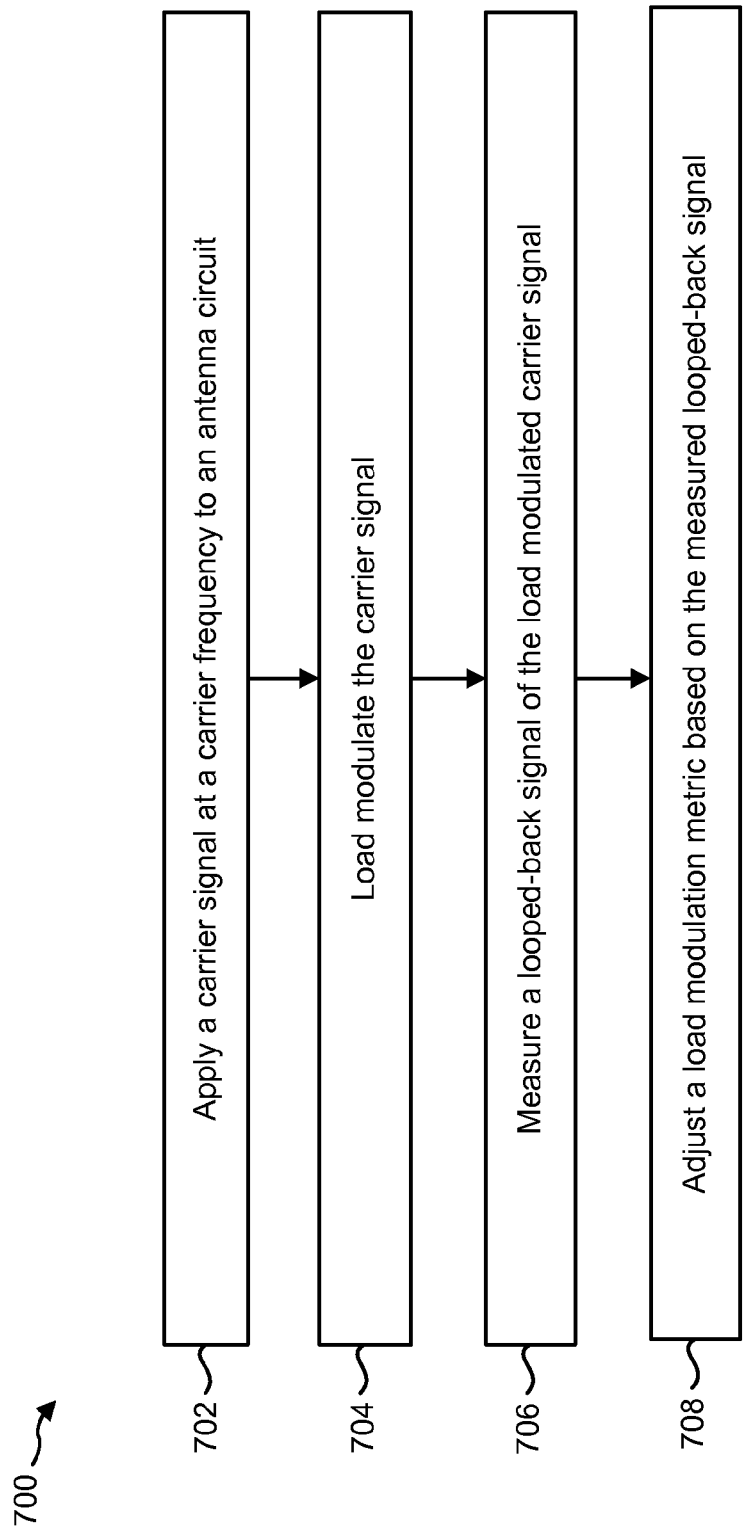
FIG. 7 is a flow diagram illustrating a method for calibrating a load modulation metric.

FIG. 7 is a flow diagram illustrating a method 700 for calibrating a load modulation metric 134. The load modulation metric 134 may include at least one of a target transmit (TTX) passive load modulation amplitude, waveform time and fidelity.

The NFC device 102 may apply 702 a carrier signal 108 at a carrier frequency 106 to an antenna circuit. For example, a transmitter 104 may operate as an initiator transmitter (ITX). The transmitter 104 may generate the carrier signal 108 at 13.56 MHz.

The NFC device 102 may load modulate 704 the carrier signal 108. For example, the transmitter 104 may simultaneously operate as a target transmitter (TTX) and load modulate the generated carrier signal 108. The NFC device 102 may load modulate the carrier signal 108 as would be done in passive or active load modulation.

The NFC device 102 may measure 706 a looped-back signal 116 of the load modulated carrier signal 108. For example, a receiver 110 operating as a target receiver (TRX) may receive the load modulated carrier signal 108. A DC estimation block 112 in the receiver 110 may measure the looped-back signal 116 by generating a DC level 114.

The NFC device 102 may adjust 708 the load modulation metric 134 according to the measured looped-back signal 116. For example, the NFC device 102 may compare the amplitude, rise time, fall time, overshoot, undershoot and distortion of the load modulated carrier signal 108 to desired levels. The NFC device 102 may then increase or decrease one or more of these load modulation metrics 134 to be within the desired levels.

In summary, the method 700 may include generating a carrier signal at a carrier frequency that is applied to an antenna circuit. The method 700 may also include load-modulating the carrier signal. The method 700 may further include measuring a looped-back signal of the load-modulated carrier signal received by the receiver coupled to the antenna circuit. The method 700 may additionally include adjusting a load modulation metric based on the measured looped-back signal.

Measuring the looped-back signal of the load-modulated carrier signal may include determining a DC level of the looped-back signal. Adjusting the load modulation metric based on the looped-back signal may include adjusting the load modulation metric according to the DC level of the looped-back signal.

The carrier signal may be generated by a near-field communication (NFC) initiator transmitter coupled to the antenna circuit. The carrier signal may be load modulated by an NFC target transmitter coupled to the antenna circuit and the carrier signal may be received by an NFC initiator receiver coupled to the antenna circuit.

The load modulation metric may include at least one of a target transmit (TTX) passive load modulation amplitude, a waveform time or fidelity. The load modulation metric may include at least one of a target transmitter (TTX) passive load modulation power control or TTX active load modulation power control.

Figure 8:
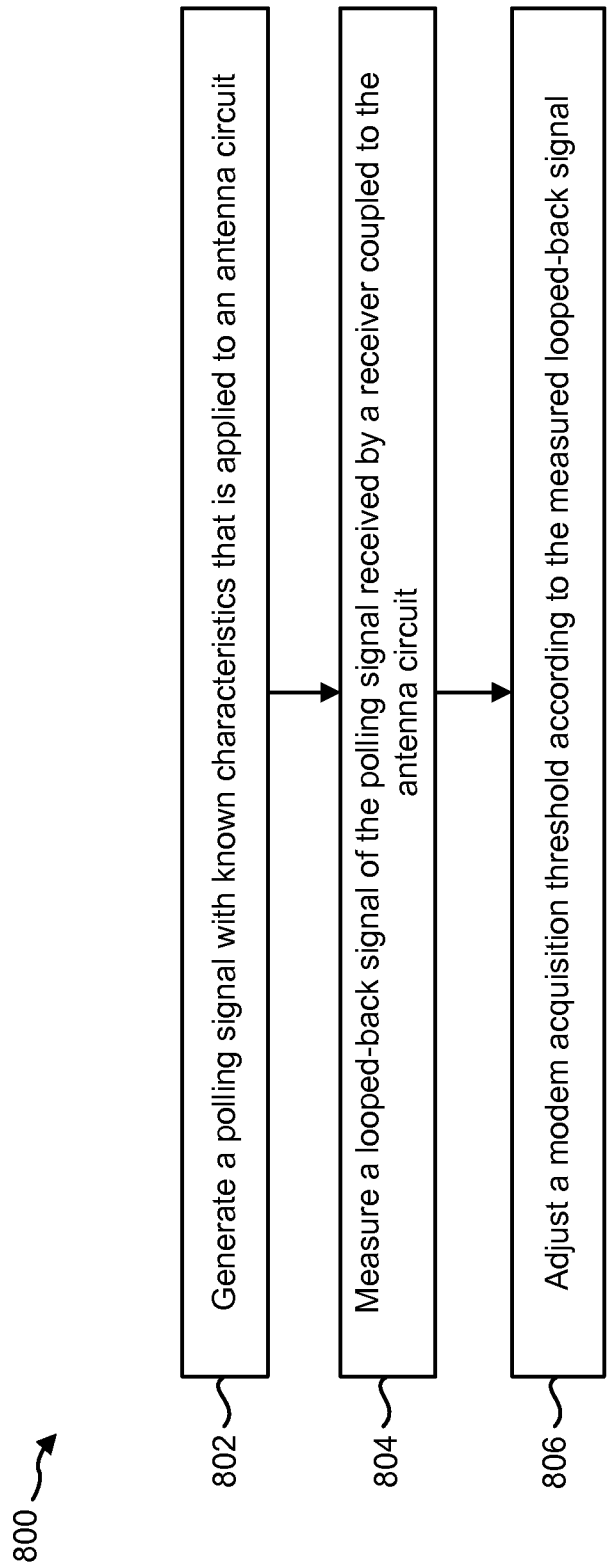
FIG. 8 is a flow diagram illustrating a method for calibrating a modem acquisition threshold.

FIG. 8 is a flow diagram illustrating a method 800 for calibrating a modem acquisition threshold 138. The method 800 may be implemented by an NFC device 102. In one configuration, the modem acquisition threshold 138 may be used during initiator receiver (IRX) operation.

The NFC device 102 may generate 802 a polling signal with known characteristics. The polling signal may be a known and previously characterized initiator transmitter (ITX) polling signal. A transmitter 104 may be coupled to an antenna circuit that includes an antenna 124 and a matching network 118. The transmitter 104 may generate the polling signal.

The NFC device 102 may measure 804 a looped-back signal 116 of the poling signal received by a receiver 110 coupled to the antenna circuit. The polling signal may be looped back to the receiver 110, which may be operating as an initiator receiver (IRX). The DC estimation block 112 may measure the looped-back signal 116 by determining a DC level 114 of the looped-back signal 116.

The NFC device 102 may adjust 806 the modem acquisition threshold 138 according to the measured looped-back signal 116. For example, the NFC device 102 may map the DC level 114 of the looped-back signal 116 to the modem acquisition threshold 138. The modem acquisition thresholds 138 for various polling signal levels may be calibrated and optimized using this loopback method.

In summary, the method 800 may include generating a polling signal with known characteristics that is applied to an antenna circuit. The method 800 may also include measuring a looped-back signal of the polling signal received by a receiver coupled to the antenna circuit. The method 800 may further include adjusting a modem acquisition threshold based on the measured looped-back signal.

The polling signal may be generated by a near-field communication (NFC) initiator transmitter coupled to the antenna circuit. The polling signal may be received by an NFC initiator receiver coupled to the antenna circuit.

Figure 9:
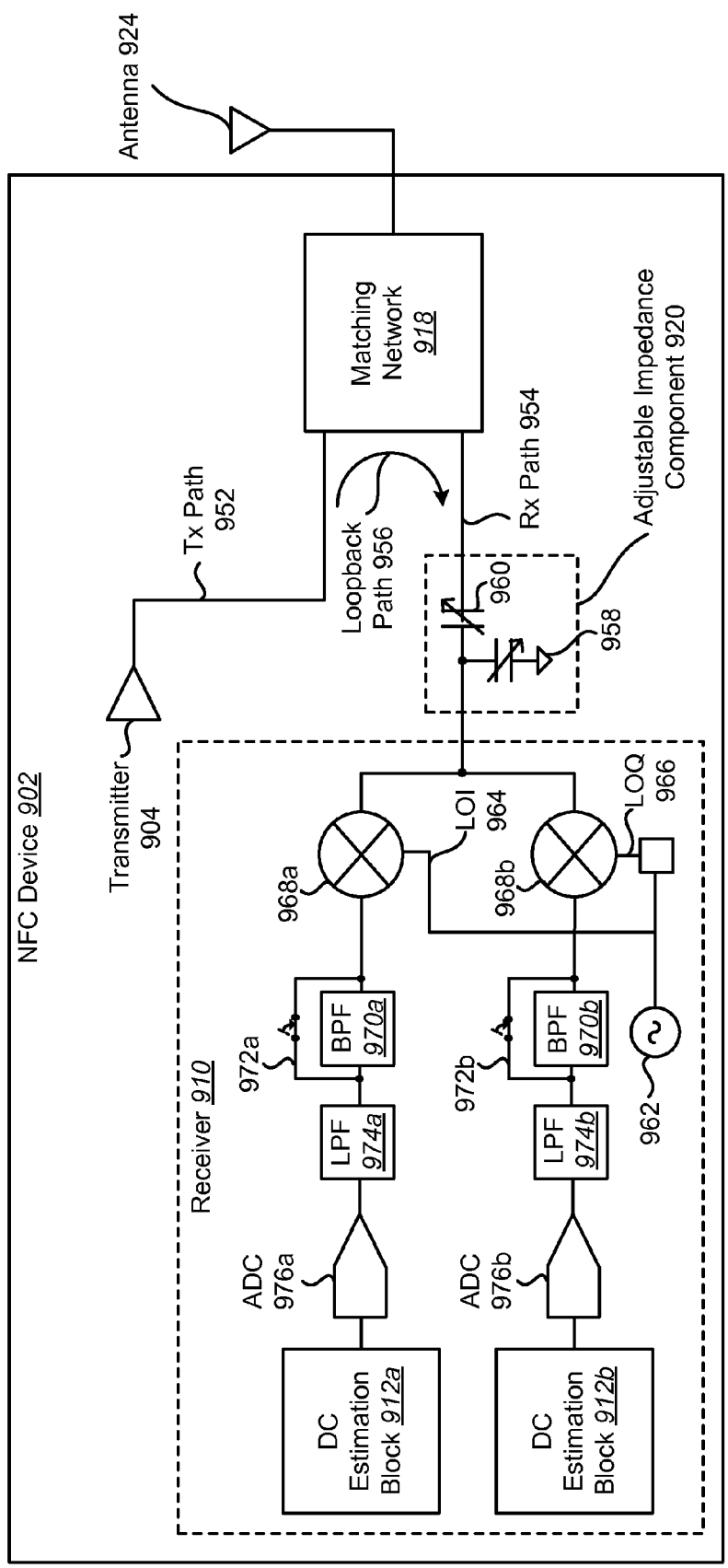
FIG. 9 is a block diagram illustrating a detailed configuration of an NFC device.

FIG. 9 is a block diagram illustrating a detailed configuration of an NFC device 902. The NFC device 902 may be implemented in accordance with the NFC device 102 described in connection with FIG. 1.

The NFC device 902 may include a transmitter 904, a receiver 910, a matching network 918 and an antenna 924. An adjustable impedance component 920 may be coupled to the matching network 118. The adjustable impedance component 920 may include a combination of variable capacitors 958, 960. In this configuration, the adjustable impedance component 920 includes at least one serial capacitor 960 and at least one parallel capacitor 958. By changing the capacitor 958, 960 configuration, the resonance of the entire solution (e.g., the matching network 118 and antenna 124) is adjusted.

In one configuration, the adjustable impedance component 920 may be included in the receiver 910. In this configuration, the adjustable impedance component 920 may be referred to as an internal matching network and the matching network 918 may be referred to as an external matching network 918.

The transmitter 904 may be coupled to the matching network 918 via a transmit (TX) path 952. The receiver 910 may be coupled to the matching network 918 via a receive (RX) path 954. A combination of the TX path 952 and the RX path 954 may form a loopback path 956. A signal (e.g., carrier signal 108) transmitted by the transmitter 904 may be received by the receiver 910 via the loopback path 956.

The receiver 910 may include an in-phase branch (I-branch) and a quadrature phase (Q-branch) coupled to the adjustable impedance component 920. The I-branch may include a mixer 968a that receives an in-phase local oscillator signal (LOI) 964 from an oscillator 962. A band pass filter (BPF) 970a and a low pass filter (LPF) 974a may provide a filtered signal to an analog to digital converter (ADC) 976a during normal operation. A carrier estimation path 972a may be switched on during calibration to bypass the BPF 970a. The ADC 976a may be coupled to a DC estimation block 912a that may generate a DC level 114 of the I-branch.

The Q-branch may include a mixer 968b that receives a quadrature phase local oscillator signal (LOQ) 966 from an oscillator 962. A band pass filter (BPF) 970b and a low pass filter (LPF) 974b may provide a filtered signal to an analog to digital converter (ADC) 976b during normal operation. A carrier estimation path 972b may be switched on during calibration to bypass the BPF 970b. The ADC 976b may be coupled to a DC estimation block 912b that may generate a DC level 114 of the Q-branch.

The loopback method described herein may be used to calibrate the resonant frequency and other metrics of the NFC device 902, as describe above in connection with FIG. 1. For example, a carrier signal 108 may be looped back along the loopback path 956. The resonance of the matching network 918 may be adjusted by adjusting capacitors 958, 960 in the adjustable impedance component 920. An impedance configuration 353 that produces the greatest DC level 114 may be the calibrated impedance 130.

In one approach, the capacitors 958, 960 (and hence impedance 122) may be adjusted based on cap codes. The DC estimation blocks may generate a DC level 114 that is proportional to the carrier signal 108 that is looped back on the loopback path 956. The cap code that produces the greatest DC level 114 (as indicated by the DC estimation blocks 912a-b) may be the calibrated cap code.

Figure 10:
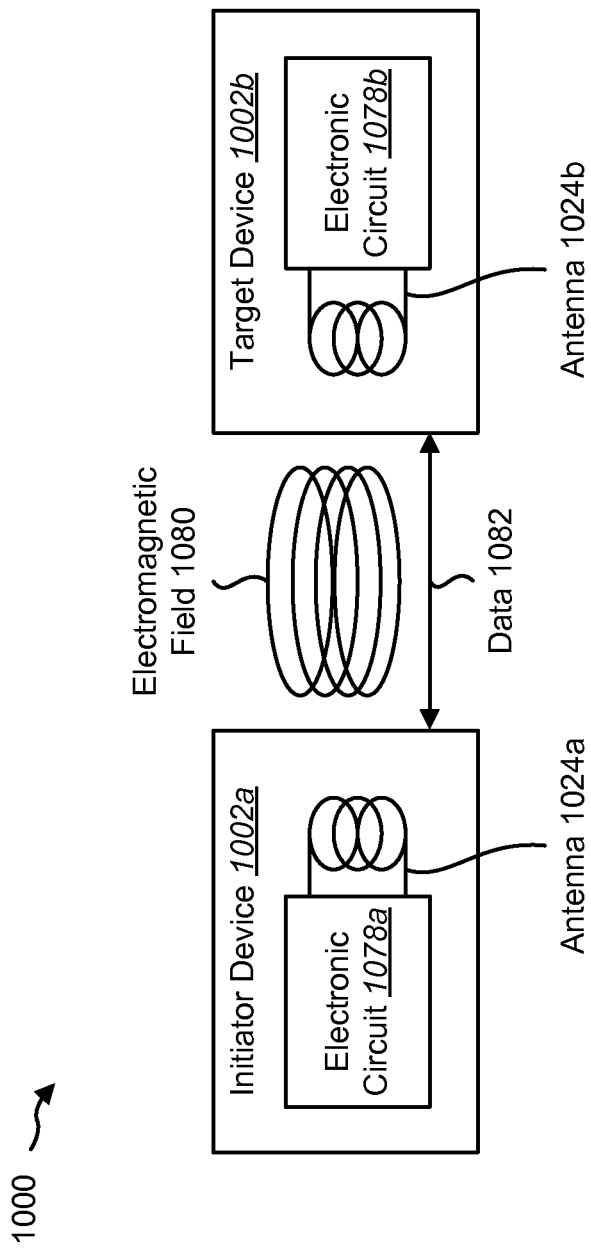
FIG. 10 is a block diagram illustrating one configuration of inductively coupled communication in a wireless communication system.

FIG. 10 is a block diagram illustrating one configuration of inductively coupled communication in a wireless communication system 1000. An initiator device 1002a and a target device 1002b may operate according to near-field communication (NFC) protocols. The initiator device 1002a and target device 1002b may be implemented according to the NFC device 102 described in connection with FIG. 1. Each device 1002a-b may include an antenna 1024a-b connected to an electronic circuit 1078a-b. During operation, the combination of two NFC devices 102 (i.e., the initiator device 1002a and target device 1002b) may behave like a transformer.

NFC is an inductive coupling communication technology. The two NFC-capable devices 1002a-b may be separated by a distance. An alternating current may pass through a primary coil (i.e., the polling device antenna 1024a) and create an electromagnetic field 1080 (which may also be referred to as a radio frequency (RF) field or radiated field). The electromagnetic field 1080 may induce a current in the secondary coil (i.e., the listening device antenna 1024b). The target device 1002b may use the electromagnetic field 1080 transmitted by the initiator device 1002a to power itself.

The configuration and tuning of both antennas 1024a-b may determine the coupling efficiency from one device to the other device. The initiator device 1002a and the target device 1002b are shown in FIG. 10. During certain NFC transactions, the target device 1002b may function as a target, which is a role defined in the NFC standards.

In one configuration, the NFC transmitter of one device and the NFC receiver of the other device are configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the "near-field" of the radiated field.

An NFC device 102 may include an NFC loop antenna 1024. The NFC loop antenna 1024 may provide a means for energy transmission and reception. As stated, an efficient energy transfer may occur by coupling a large portion of the energy in the near-field of a transmitting antenna 1024 to a receiving antenna 1024 rather than propagating most of the energy in an electromagnetic wave to the far field.

An NFC-capable device may obtain sufficient data 1082 to allow for communications to be established. One form of communications that may be established is an international standards organization data exchange protocol (ISO-DEP) communication link. Communications between the NFC devices 102 may be enabled over a variety of NFC radio frequency (RF) technologies, including but not limited to, NFC-A, NFC-B, NFC-F, etc.

Figure 11:
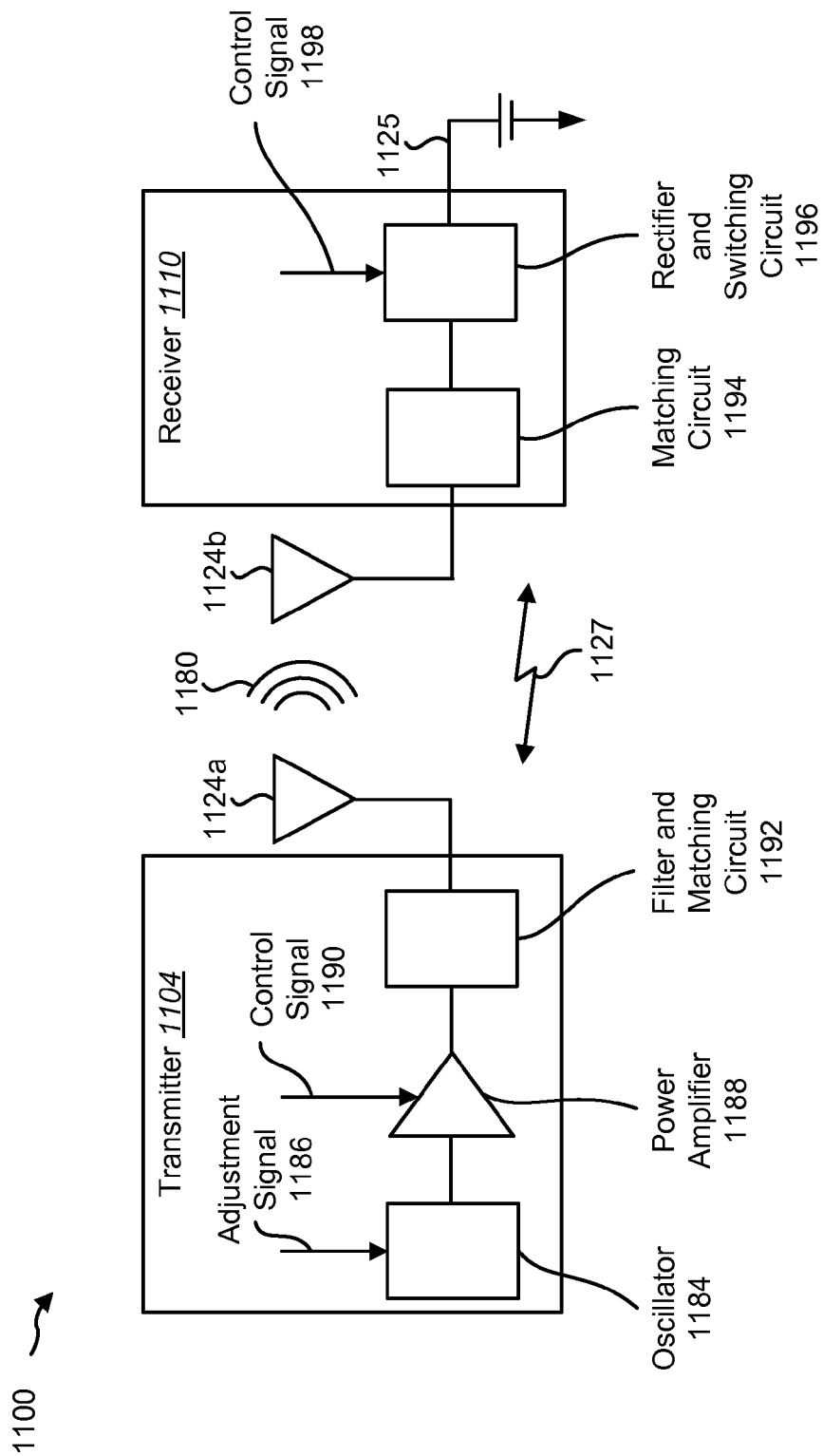
FIG. 11 shows a simplified schematic diagram of a near-field wireless communication system.

FIG. 11 shows a simplified schematic diagram of a near-field wireless communication system 1100. The transmitter 1104 includes an oscillator 1184, a power amplifier 1188 and a filter and matching circuit 1192. The oscillator 1184 is configured to generate a signal at a desired frequency, which may be adjusted in response to an adjustment signal 1186. The oscillator 1184 signal may be amplified by the power amplifier 1188 with an amplification amount responsive to a control signal 1190. The filter and matching circuit 1192 may be included to filter out harmonics or other unwanted frequencies and match the impedance of the transmitter 1104 to the transmit antenna 1124a. The transmit antenna 1124a may transmit a radiated field 1180.

The receiver 1110 may include a matching circuit 1194 and a rectifier and switching circuit 1196 to generate a DC power output 1125 to charge a battery 145 or power a device (not shown) coupled to the receiver. The matching circuit 1194 may be included to match the impedance of the receiver 1110 to the receive antenna 1124b. The rectifier switching circuit 1196 may be adjusted by a control signal 1198. The receiver 1110 and transmitter 1104 may communicate on a separate communication channel 1127 (e.g., Bluetooth, zigbee, cellular, etc.).

Figure 12:
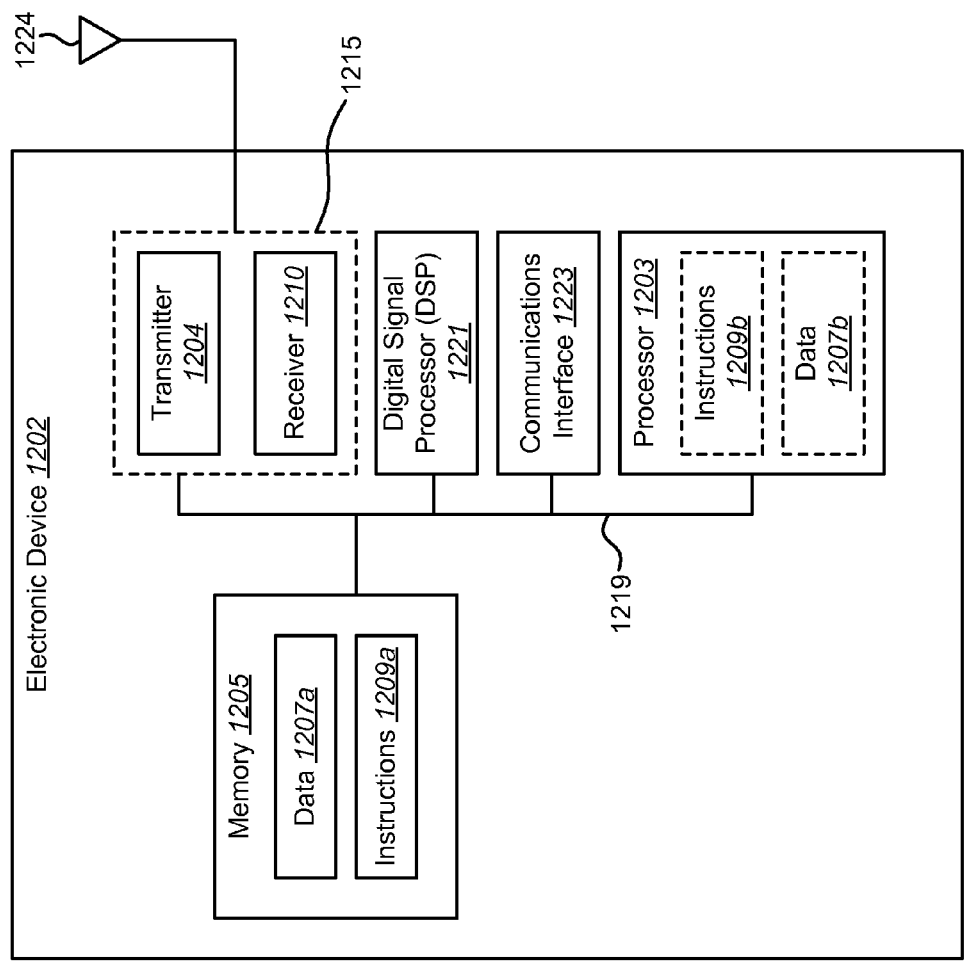
FIG. 12 illustrates certain components that may be included within an electronic device.

FIG. 12 illustrates certain components that may be included within an electronic device 1202. The electronic device 1202 may be an access terminal, a mobile station, a user equipment (UE), etc. For example, the electronic device 1202 may be the NFC device 102 of FIG. 1 or the NFC device 302 of FIG. 3.

The electronic device 1202 includes a processor 1203. The processor 1203 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1203 may be referred to as a central processing unit (CPU). Although just a single processor 1203 is shown in the electronic device 1202 of FIG. 12, in an alternative configuration, a combination of processors (e.g., an ARM and DSP) could be used.

The electronic device 1202 also includes memory 1205 in electronic communication with the processor (i.e., the processor can read information from and/or write information to the memory). The memory 1205 may be any electronic component capable of storing electronic information. The memory 1205 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1207a and instructions 1209a may be stored in the memory 1205. The instructions may include one or more programs, routines, sub-routines, functions, procedures, code, etc. The instructions may include a single computer-readable statement or many computer-readable statements. The instructions 1209a may be executable by the processor 1203 to implement the methods disclosed herein. Executing the instructions 1209a may involve the use of the data 1207a that is stored in the memory 1205. When the processor 1203 executes the instructions 1209, various portions of the instructions 1209b may be loaded onto the processor 1203, and various pieces of data 1207b may be loaded onto the processor 1203.

The electronic device 1202 may also include a transmitter 1204 and a receiver 1210 to allow transmission and reception of signals to and from the electronic device 1202 via an antenna 1224. The transmitter 1204 and receiver 1210 may be collectively referred to as a transceiver 1215. The electronic device 1202 may also include (not shown) multiple transmitters, multiple antennas, multiple receivers and/or multiple transceivers.

The electronic device 1202 may include a digital signal processor (DSP) 1221. The electronic device 1202 may also include a communications interface 1223. The communications interface 1223 may allow a user to interact with the electronic device 1202.

The various components of the electronic device 1202 may be coupled together by one or more buses, which may include a power bus, a control signal bus, a status signal bus, a data bus, etc. For the sake of clarity, the various buses are illustrated in FIG. 12 as a bus system 1219.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIGS. 4-8 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for inductively coupled communication, comprising:
    applying a carrier signal at a carrier frequency to an antenna circuit, the antenna circuit comprising an antenna and a matching network that resonate at a resonant frequency;
    measuring a looped-back signal over a range of impedance values, the looped-back signal comprising the carrier signal received by a receiver coupled to the antenna circuit;
    setting a calibrated impedance as an impedance configuration that produces a resonance peak in the looped-back signal;
    determining an impedance offset based on a difference between a default impedance and the calibrated impedance, wherein the default impedance comprises a preconfigured matching network impedance associated with the carrier frequency; and
    applying the impedance offset to the matching network for an operation that uses a second carrier frequency that differs from the carrier frequency used to set the calibrated impedance.

2. The method of claim 1, wherein measuring the looped-back signal over a range of impedance values comprises:
    applying a first impedance configuration to the antenna circuit;
    measuring a resonance of the looped-back signal based on the first impedance configuration;
    determining whether there is a subsequent impedance configuration to apply;
    applying the subsequent impedance configuration to the antenna circuit; and
    measuring resonance of the looped-back signal based on the subsequent impedance configuration.

3. The method of claim 1, wherein measuring the looped-back signal over the range of impedance values comprises measuring a DC level that is proportional to the looped-back signal, the DC level being measured over the range of impedance values.

4. The method of claim 1, wherein an impedance configuration comprises a set of capacitance values applied to one or more capacitors in the matching network that produces a given impedance in the antenna circuit.

5. The method of claim 1, wherein the carrier signal is generated by a near-field communication (NFC) initiator transmitter coupled to the antenna circuit and the carrier signal is received by an NFC initiator receiver coupled to the antenna circuit.

6. An electronic device for inductively coupled communication, comprising:
    a processor;
    a memory in communication with the processor; and
    instructions stored in the memory, the instructions executable by the processor to:
    apply a carrier signal at a carrier frequency to an antenna circuit, the antenna circuit comprising an antenna and a matching network that resonate at a resonant frequency;
    measure a looped-back signal over a range of impedance values, the looped-back signal comprising the carrier signal received by a receiver coupled to the antenna circuit;

set a calibrated impedance as an impedance configuration that produces a resonance peak in the looped-back signal;

determine an impedance offset based on a difference between a default impedance and the calibrated impedance, wherein the default impedance comprises a preconfigured matching network impedance associated with the carrier frequency; and apply the impedance offset to the matching network for an operation that uses a second carrier frequency that differs from the carrier frequency used to set the calibrated impedance.

7. The electronic device of claim 6, wherein the instructions executable to measure the looped-back signal over a range of impedance values comprise instructions executable to:

apply a first impedance configuration to the antenna circuit;

measure a resonance of the looped-back signal based on the first impedance configuration;

determine whether there is a subsequent impedance configuration to apply;

apply the subsequent impedance configuration to the antenna circuit; and measure resonance of the looped-back signal based on the subsequent impedance configuration.

8. The electronic device of claim 6, wherein the instructions executable to measure the looped-back signal over the range of impedance values comprise instructions executable to measure a DC level that is proportional to the looped-back signal, the DC level being measured over the range of impedance values.

9. The electronic device of claim 6, wherein an impedance configuration comprises a set of capacitance values applied to one or more capacitors in the matching network that produces a given impedance in the antenna circuit.

10. The electronic device of claim 6, wherein the carrier signal is generated by a near-field communication (NFC) initiator transmitter coupled to the antenna circuit and the carrier signal is received by an NFC initiator receiver coupled to the antenna circuit.

11. An apparatus for inductively coupled communication, comprising:

means for applying a carrier signal at a carrier frequency to an antenna circuit, the antenna circuit comprising an antenna and a matching network that resonate at a resonant frequency;

means for measuring a looped-back signal over a range of impedance values, the looped-back signal comprising the carrier signal received by a receiver coupled to the antenna circuit;

means for setting a calibrated impedance as an impedance configuration that produces a resonance peak in the looped-back signal;

means for determining an impedance offset based on a difference between a default impedance and the calibrated impedance, wherein the default impedance comprises a preconfigured matching network impedance associated with the carrier frequency; and means for applying the impedance offset to the matching network for an operation that uses a second carrier frequency that differs from the carrier frequency used to set the calibrated impedance.

12. The apparatus of claim 11, wherein the means for measuring the looped-back signal over a range of impedance values comprise:

means for applying a first impedance configuration to the antenna circuit;

means for measuring a resonance of the looped-back signal based on the first impedance configuration;

means for determining whether there is a subsequent impedance configuration to apply;

means for applying the subsequent impedance configuration to the antenna circuit; and means for measuring resonance of the looped-back signal based on the subsequent impedance configuration.

13. A computer-program product, the computer-program product comprising a non-transitory computer-readable medium having instructions thereon, the instructions comprising:

code for causing an electronic device to apply a carrier signal at a carrier frequency to an antenna circuit, the antenna circuit comprising an antenna and a matching network that resonate at a resonant frequency;

code for causing the electronic device to measure a looped-back signal over a range of impedance values, the looped-back signal comprising the carrier signal received by a receiver coupled to the antenna circuit;

code for causing the electronic device to set a calibrated impedance as an impedance configuration that produces a resonance peak in the looped-back signal;

code for causing the electronic device to determine an impedance offset based on a difference between a default impedance and the calibrated impedance, wherein the default impedance comprises a preconfigured matching network impedance associated with the carrier frequency; and code for causing the electronic device to apply the impedance offset to the matching network for an operation that uses a second carrier frequency that differs from the carrier frequency used to set the calibrated impedance.

14. The computer-program product of claim 13, wherein the code for causing the electronic device to measure the looped-back signal over a range of impedance values comprises:

code for causing the electronic device to apply a first impedance configuration to the antenna circuit;

code for causing the electronic device to measure a resonance of the looped-back signal based on the first impedance configuration;

code for causing the electronic device to determine whether there is a subsequent impedance configuration to apply;

code for causing the electronic device to apply the subsequent impedance configuration to the antenna circuit; and code for causing the electronic device to measure resonance of the looped-back signal based on the subsequent impedance configuration.

15. A method for inductively coupled communication, comprising:

generating a carrier signal with a carrier level corresponding to a gain state;

measuring a looped-back signal received by a receiver coupled to an antenna circuit;

calibrating an automatic gain control (AGC) threshold for the gain state according to the measured looped-back signal; and associating the calibrated AGC threshold to the gain state.

16. The method of claim 15, further comprising:

determining that there is an additional AGC threshold to be calibrated for an additional gain state;

generating a carrier signal with a carrier signal with a carrier level corresponding to the additional gain state;

measuring an additional looped-back signal received by the receiver coupled to the antenna circuit;

calibrating the additional AGC threshold for the additional gain state according to the measured additional looped-back signal; and associating the calibrated additional AGC threshold to the additional gain state.

17. The method of claim 15, further comprising:

applying a calibrated AGC threshold for a given carrier level based on the gain state association.

18. An electronic device for inductively coupled communication, comprising:

a processor;

a memory in communication with the processor; and instructions stored in the memory, the instructions executable by the processor to:

generate a carrier signal with a carrier level corresponding to a gain state;

measure a looped-back signal received by a receiver coupled to an antenna circuit;

calibrate an automatic gain control (AGC) threshold for the gain state according to the measured looped-back signal; and associate the calibrated AGC threshold to the gain state.

19. The electronic device of claim 18, further comprising instructions executable to:

determine that there is an additional AGC threshold to be calibrated for an additional gain state;

generate a carrier signal with a carrier signal with a carrier level corresponding to the additional gain state;

measure an additional looped-back signal received by the receiver coupled to the antenna circuit;

calibrate the additional AGC threshold for the additional gain state according to the measured additional looped-back signal; and associate the calibrated additional AGC threshold to the additional gain state.

20. The electronic device of claim 18, further comprising instructions executable to:

apply a calibrated AGC threshold for a given carrier level based on the gain state association.

21. An apparatus for inductively coupled communication, comprising:

means for generating a carrier signal with a carrier level corresponding to a gain state;

means for measuring a looped-back signal received by a receiver coupled to an antenna circuit;

means for calibrating an automatic gain control (AGC) threshold for the gain state according to the measured looped-back signal; and means for associating the calibrated AGC threshold to the gain state.

22. The apparatus of claim 21, further comprising:

means for determining that there is an additional AGC threshold to be calibrated for an additional gain state;

means for generating a carrier signal with a carrier signal with a carrier level corresponding to the additional gain state;

means for measuring an additional looped-back signal received by the receiver coupled to the antenna circuit;

means for calibrating the additional AGC threshold for the additional gain state according to the measured additional looped-back signal; and means for associating the calibrated additional AGC threshold to the additional gain state.

23. The apparatus of claim 21, further comprising:

means for applying a calibrated AGC threshold for a given carrier level based on the gain state association.

24. A computer-program product, the computer-program product comprising a non-transitory computer-readable medium having instructions thereon, the instructions comprising:

code for causing an electronic device to generate a carrier signal with a carrier level corresponding to a gain state;

code for causing the electronic device to measure a looped-back signal received by a receiver coupled to an antenna circuit;

code for causing the electronic device to calibrate an automatic gain control (AGC) threshold for the gain state according to the measured looped-back signal; and code for causing the electronic device to associate the calibrated AGC threshold to the gain state.

25. The computer-program product of claim 24, further comprising:

code for causing the electronic device to determine that there is an additional AGC threshold to be calibrated for an additional gain state;

code for causing the electronic device to generate a carrier signal with a carrier signal with a carrier level corresponding to the additional gain state;

code for causing the electronic device to measure an additional looped-back signal received by the receiver coupled to the antenna circuit;

code for causing the electronic device to calibrate the additional AGC threshold for the additional gain state according to the measured additional looped-back signal; and code for causing the electronic device to associate the calibrated additional AGC threshold to the additional gain state.

26. The computer-program product of claim 24, further comprising:

code for causing the electronic device to apply a calibrated AGC threshold for a given carrier level based on the gain state association.

* * * * *